Dec. 8, 1959   J. W. EDWARDS   2,916,354
METHOD OF PRODUCING PHOSPHATES
Filed Oct. 16, 1956   3 Sheets—Sheet 1
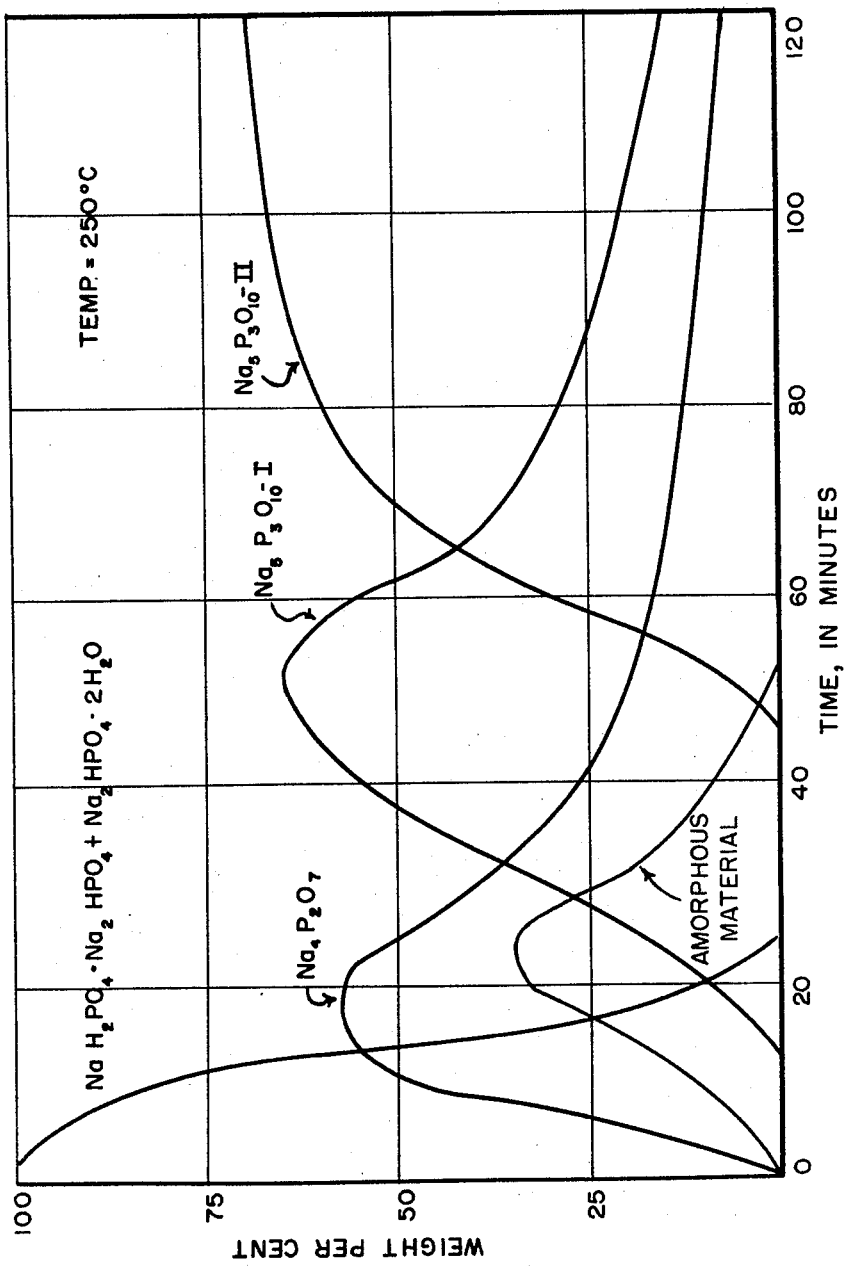
FIGURE I
INVENTOR.
JAMES W. EDWARDS
BY
HIS AGENT

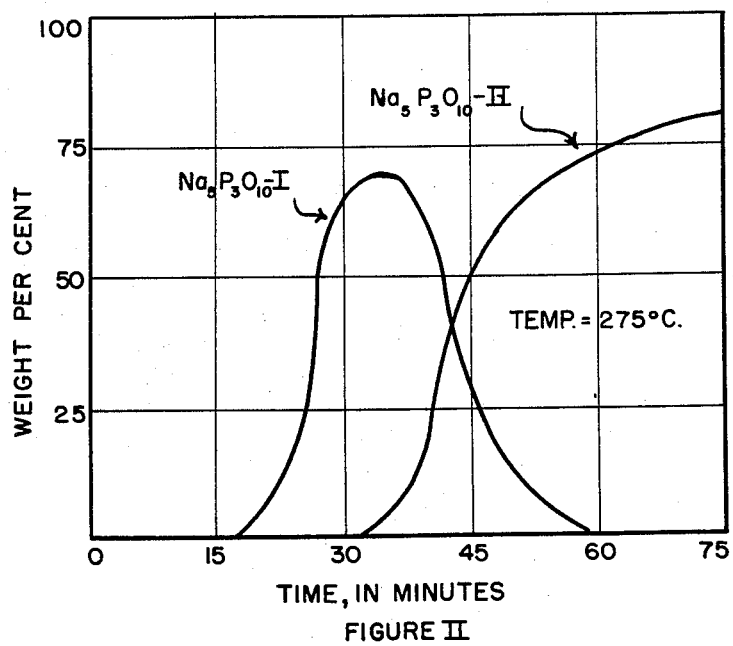
FIGURE II

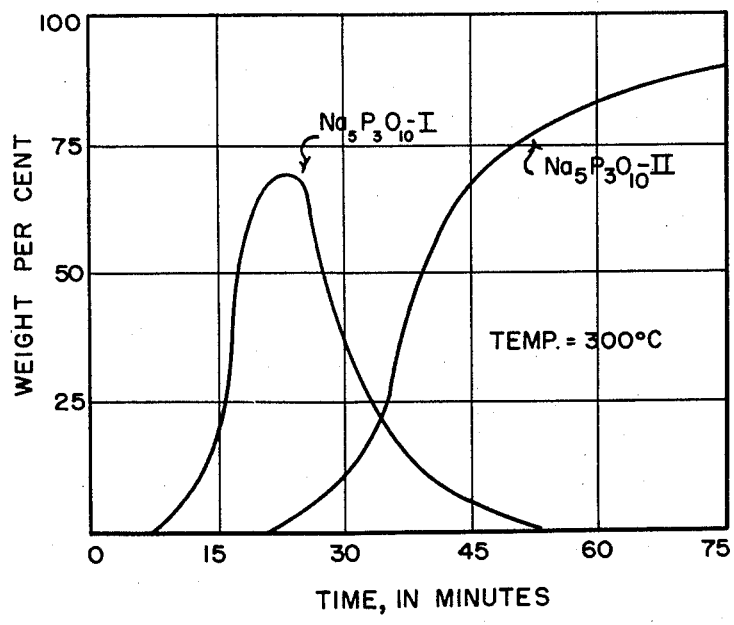
FIGURE III

2,916,354
METHOD OF PRODUCING PHOSPHATES

James W. Edwards, Kettering, Ohio, assignor to Monsanto Chemical Company, St. Louis, Mo., a corporation of Delaware Application October 16, 1956, Serial No. 616,911

8 Claims. (Cl. 23—106)

This invention relates to novel methods of producing sodium phosphates. More specifically, the invention relates to novel methods for preparing sodium tripolyphosphate, particularly sodium tripolyphosphate containing an appreciable portion of the so-called "high-temperature form," or sodium tripolyphosphate-I.

Sodium tripolyphosphate, $Na_5P_3O_{10}$, is known to be a polymorphic material of which at least two separate and distinct solid forms have been identified. These forms are commonly referred to as "Form I" and "Form II," and are designated by the formulae, $Na_5P_3O_{10}$—I and $Na_5P_3O_{10}$—II, respectively. (See Partridge et al., Journal of the American Chemical Society, vol. 63, page 454 et seq.)

The predominant proportion of sodium tripolyphosphate now produced commercially is $Na_5P_3O_{10}$—II, which is generally manufactured by a process involving heating a mixture of phosphates, e.g., monosodium orthophosphate and disodium orthophosphate, at relatively low temperatures (i.e., less than about 470° C.) until the mixture has been converted to the sodium tripolyphosphate. Because $Na_5P_3O_{10}$—II is prepared at the relatively low temperatures, it is often referred to as the "low-temperature form" of sodium tripolyphosphate. The other form of sodium tripolyphosphate, $Na_5P_3O_{10}$—I, is often referred to as the "high-temperature form" of sodium tripolyphosphate because prior to the present invention it was not known that this material could be prepared except at temperatures considerably higher than 470° C. It has now been found, however, that the so-called "high-temperature form" can be produced at temperatures usually used only for production of the "low-temperature form."

The present invention is predicated upon the discoveries (1) that $Na_5P_3O_{10}$—I is a transitory intermediate in the low-temperature conversion of some phosphate mixtures to $Na_5P_3O_{10}$—II, (2) that with certain of said phosphate mixtures (described more fully herein below) the concentration of $Na_5P_3O_{10}$—I, builds up to a rather high level for at least a short period of time during the conversion and (3) that the conversion process can be arrested at a point of high concentration of $Na_5P_3O_{10}$—I, to give a produce in which $Na_5P_3O_{10}$—I predominates. This last step can be readily arrested by cooling the solid reaction mass at the proper time.

The phosphate mixtures which have been found to give sodium tripolyphosphate—I as a low-temperature intermediate product are those in which the overall molecular ratio of $Na_2O$ to $P_2O_5$ is between about 1.5 and about 1.8, and preferably between about 1.6 and about 1.7, and in which the overall molecular proportion of $Na_2O$ to water of constitution (as distinguished from water of hydration) is less than about 10, and preferably less than about 5. The phosphate mixtures can be made up of ortho, meta, or pyrophosphates, or combinations thereof, can be either hydrated or anhydrous, and can include normal salts as well as acid salts. While it is generally more convenient to use a mixture of only two different phosphate salts, mixtures of more than two can be utilized equally well.

Examples of suitable phosphate mixtures for conversion to $Na_5P_3O_{10}$—I, according to the present invention are as follows:

(1) Sixty-five weight percent trisodium hydrogen pyrophosphate monohydrate and 35 weight percent disodium orthophosphate.

(2) Sixty-five weight percent monosodium orthophosphate-disodium orthophosphate double salt and 35 weight percent disodium orthophosphate.

(3) Sixty weight percent monosodium orthophosphate-disodium-orthophosphate double salt and 40 weight percent disodium orthophosphate dihydrate.

(4) Sixty weight percent trisodium hydrogen pyrophosphate monohydrate and 40 weight percent disodium orthophosphate dihydrate.

(5) Twenty-two weight percent monosodium orthophosphate and 78 weight percent disodium orthophosphate.

(6) Twenty-five weight percent monosodium orthophosphate and 75 weight percent disodium orthophosphate dihydrate.

(7) Twenty weight percent monosodium orthophosphate and 80 weight percent tetrasodium pyrophosphate decahydrate.

(8) Thirty-nine weight percent monosodium orthophosphate and 61 weight percent trisodium orthophosphate dodecahydrate.

(9) Nine weight percent sodium acid pyrophosphate, 85 weight percent tetrasodium pyrophosphate decahydrate and 6 weight percent monosodium orthophosphate.

(10) Fifteen weight percent sodium metaphosphate, 18 weight percent monosodium orthophosphate, and 67 weight percent disodium orthophosphate dihydrate.

When phosphate mixtures such as the foregoing are heated for very long times at temperatures ranging between about 200° C. and about 470° C., a series of consecutive solid-phase reactions take place, culminating in the formation of the stable composition, sodium tripolyphosphate-II. The progress of a typical conversion of this type is illustrated in Figure I of the drawings, which is a plot of the changes in chemical composition (with respect to time) of a mixture of one molecular proportion of disodium orthophosphate dihydrate and one molecular proportion of monosodium orthophosphate-disodium, orthophosphate double salt. The data for this figure were obtained by placing numerous samples (of about 2½ g. each) of the reaction mixture in separate small crucibles and heating in a furnace at 250° C. Each of the crucibles was withdrawn from the furnace at a different time, and the contents thereof were cooled and analyzed. The analyses were made by X-ray diffraction techniques, so that it was not possible to identify material which occurred in amorphous form. It is believed, however, that the material identified in Figure I as "amorphous material" was predominately disodium dihydrogen pyrophosphate.

From Figure I it can be seen that when the reaction is stopped at the proper intermediate stage, there is obtained a product in which sodium tripolyphosphate-I constitutes an appreciable or even the predominant proportion. This can be readily accomplished by cooling the reacting solids to below about 150° C., and preferably below about 100° C., at which temperatures the rate of further reaction is so slow that it is (for all practical purposes) zero.

The exact time at which the reaction must be stopped in order to obtain the $Na_5P_3O_{10}$—I depends quite markedly upon the particular chemical reactants utilized, and particularly upon the proportions and the physical states thereof, i.e., the degree of subdivision, uniformity of mixing, etc. The order of magnitude of variation in time, as affected by the above factors, can be seen by a comparison of the curves of Figure I with the data presented in Example 1, below. For example, Figure I shows that the maximum concentration of $Na_5P_3O_{10}$—I occurs at shortly less than one hour of heating a mixture of monosodium orthophosphate-disodium orthophosphate double salt and disodium orthophosphate dihydrate. The starting materials in Example 1 differed from those of Figure I in that the disodium orthophosphate was anhydrous rather than hydrated—and the maximum concentration of $Na_5P_3O_{10}$—I, did not occur until about 3 hours.

The effect of particle size and intimacy of intermixing is not altogether clear. As would be expected, it appears that the rate of reaction increases as the reactants are ground more finely and intermixed more thoroughly. However, it also appears that the conversion of $Na_5P_3O_{10}$—I to $Na_5P_3O_{10}$—II increases more rapidly than the conversion of $Na_4P_2O_7$ and amorphous material ($Na_2H_2P_2O_7$) to $Na_5P_3O_{10}$—I, with the net result that the maximum concentration of $Na_5P_3O_{10}$—I obtained becomes lower.

The effect of temperature upon the time required to reach a maximum concentration of $Na_5P_3O_{10}$—I is illustrated in Figures II and III, taken in conjunction with Figure I. Figure II and III show the results of experiments carried out under the same conditions used in obtaining the data for Figure I, except that different conversion temperatures were used. A comparison of Figures I, II and III reveals that the heating time (required to reach a maximum concentration of $Na_5P_3O_{10}$—I) decreases and that yields of $Na_5P_3O_{10}$—I increase with increasing temperature, but that the time at which the reaction mixture must be cooled becomes considerably more critical, i.e., the period during which $Na_5P_3O_{10}$—I is present in appreciable quantities becomes considerably shorter. Conversion according to the present invention can be carried out at any temperature between about 200° C. and about 470° C.; it is preferably carried out between about 250° C. and about 450° C.

In view of the foregoing, it is apparent that the determination of the time at which the reaction products should be cooled will best be determined experimentally, such as by following the course of the reaction under a particular set of selected conditions in order to determine when the concentration of $Na_5P_3O_{10}$—I has reached the desired value. The concentration of $Na_5P_3O_{10}$—I can be determined in numerous ways, one of the more reliable being by X-ray diffraction analysis. A somewhat simpler, though still fairly reliable, method of determining the $Na_5P_3O_{10}$—I content is the so-called "Temperature Rise Test." (See J. D. McGilvery, ASTM Bulletin 191, pages 45–48, July 1953.) When utilizing this latter method for analyzing samples containing greater than about 30 percent of $Na_5P_3O_{10}$—I, it is sometimes necessary to modify the procedure to the extent that stirring of the solution is stopped if the solution sets up to a very stiff mass. It has been found, however, that omission of continued stirring in such an event has very little effect upon the reliability of the results obtained by this test.

The presence of as little as 5 or 10 percent of $Na_5P_3O_{10}$—I in a tripolyphosphate composition can be a significant factor in some uses for tripolyphosphates. An example of this is described in Mills et al.—U.S. 2,712,529, dealing with a process for formulating spray-dried detergent compositions. In order to make such a product according to the present invention, the reaction should be stopped at a time when the product exhibits a temperature rise (in the aforementioned "Temperature Rise Test") of at least 8.5° C., which corresponds to about 10 weight percent $Na_5P_3O_{10}$—I. With higher concentrations of $Na_5P_3O_{10}$, for example, 20 weight percent or 50 weight percent, the product will exhibit temperature rises of about 11° C. and 18.5° C., respectively.

It will be noted from Figure I that the products produced by the present invention often contain at least small amounts of phosphates other than sodium tripolyphosphates—the principal one generally being tetrasodium pyrophosphate. These other phosphates behave substantially the same as $Na_5P_3O_{10}$—II in the "Temperature Rise Test," and will not, therefore, interfere with the determination of the concentration of $Na_5P_3O_{10}$—I. Thus, the concentrations are based upon the total composition, including these other phosphate constituents, and not upon just the tripolyphosphate components. This is the same basis upon which the concentrations are expressed in the present specification.

The following example is presented as illustrative of the results which can be achieved according to the practice of the present invention.

Example

About 2.5 g. of a mixture of equimolar proportions of anhydrous disodium orthophosphate and monosodium orthophosphate-disodium orthophosphate double salt was placed in an uncovered porcelain crucible and heated in an oven at 250° C. for about 3 hours. The crucible was then removed from the oven, the contents thereof cooled, and the product analyzed by X-ray diffraction techniques. The product contained about 70 weight percent of STP—I and about 15 weight percent of STP—II, with the remainder being substantially all sodium pyrophosphates.

This application is a continuation-in-part of my copending application Serial No. 398,726, filed December 17, 1953, now abandoned.

I claim:

1. A low temperature method for making sodium tripolyphosphate containing a predominant portion of $Na_5P_3O_{10}$—I, which method comprises heating a mixture of sodium phosphates, other than sodium tripolyphosphate, having an overall molecular ratio of $Na_2O$ to $P_2O_5$ between about 1.5 and about 1.8 and an overall molecular ratio of $Na_2O$ to water of constitution of less than about 10, at a temperature between about 200° C. and about 470° C. until the mixture has been converted to a product which contains a predominant proportion of $Na_5P_3O_{10}$—I and which will exhibit a temperature rise of at least about 18.5° C. in the standard temperature rise test, and then cooling to below about 150° C.

2. A low temperature method for making sodium tripolyphosphate containing a predominant proportion of $Na_5P_3O_{10}$—I, which method comprises heating a mixture of sodium orthophosphates having an overall molecular ratio of $Na_2O$ to $P_2O_5$ between about 1.5 and about 1.8, at a temperature between about 200° C. and about 470° C. until the mixture has been converted to a product which contains a predominant proportion of $Na_5P_3O_{10}$—I and which will exhibit a temperature rise of at least about 18.5° C. in the standard temperature rise test, and then cooling to below about 150° C.

3. A low temperature method for making sodium tripolyphosphate containing a predominant proportion of $Na_5P_3O_{10}$—I, which method comprises heating a mixture of sodium phosphates, other than sodium tripolyphosphate, having an overall molecular ratio of $Na_2O$ to $P_2O_5$ between about 1.6 and about 1.7 and an overall molecular ratio of $Na_2O$ to water of constitution of less than about 5, at a temperature between about 250° C. and about 450° C. until the mixture has been converted to a product which contains a predominant proportion of $Na_5P_3O_{10}$—I and which will exhibit a temperature rise of at least about 18.5° C. in the standard temperature rise test, and then cooling to below about 150° C.

4. A low temperature method for making sodium tripolyphosphate containing a predominant proportion of $Na_5P_3O_{10}$—I, which method comprises heating a mixture of sodium orthophosphates having an overall molecular ratio of $Na_2O$ to $P_2O_5$ between about 1.6 and about 1.7, at a temperature between about 250° C. and about 450° C. until the mixture has been converted to a product which contains a predominant proportion of $Na_5P_3O_{10}$—I and which will exhibit a temperature rise of at least about 18.5° C. in the standard temperature rise test, and then cooling to below about 150° C.

5. A low temperature method for making sodium tripolyphosphate containing a predominant proportion of $Na_5P_3O_{10}$—I, which method comprises heating a mixture of approximately equimolar proportions of monosodium orthophosphate-disodium orthophosphate double salt and disodium orthophosphate at a temperature between about 250° C. and about 450° C. until the mixture has been converted to a product which contains a predominant proportion of $Na_5P_3O_{10}$—I and which will exhibit a temperature rise of at least about 20° C. as measured in the standard temperature rise test, and then cooling said product to below about 150° C.

6. A low temperature method for making sodium tripolyphosphate containing at least 10% of $Na_5P_3O_{10}$—I, which method comprises heating a mixture of sodium phosphates, other than sodium tripolyphosphates, having an overall molecular ratio of $Na_2O$ to $P_2O_5$ between about 1.5 and about 1.8 and an overall molecular ratio of $Na_2O$ to water of constitution of less than about 10, at a temperature between about 200° C. and about 470° C. until the mixture has been converted to a product which contains at least 10% of $Na_5P_3O_{10}$—I and which will exhibit a temperature rise of at least about 8.5° C. in the standard temperature rise test, and then cooling to below about 150° C.

7. A low temperature method for making sodium tripolyphosphate containing at least 20% of $Na_5P_3O_{10}$—I, which method comprises heating a mixture of sodium orthophosphates having an overall molecular ratio of $Na_2O$ to $P_2O_5$ between about 1.6 and about 1.7, at a temperature between about 250° C., and about 450° C. until the mixture has been converted to a product which contains at least 20% of $Na_5P_3O_{10}$—I and which will exhibit a temperature rise of at least about 11° C. in the standard temperature rise test, and then cooling to below about 150° C.

8. A low temperature method for making sodium tripolyphosphate containing at least 20% of $Na_5P_3O_{10}$—I, which method comprises heating a mixture of approximately equimolar proportions of monosodium orthophosphate-disodium orthophosphate double salt and disodium orthophosphate at a temperature between about 250° C. and about 450° C. until the mixture has been converted to a product which contains at least 20% of $Na_5P_3O_{10}$—I and which will exhibit a temperature rise of at least about 11° C. as measured in the standard temperature rise test, and then cooling said product to below about 150° C.

References Cited in the file of this patent

UNITED STATES PATENTS

| | | |
|---|---|---|
| 2,174,614 | Bornemann | Oct. 3, 1939 |
| 2,182,357 | Schwartz | Dec. 5, 1939 |

FOREIGN PATENTS

| | | |
|---|---|---|
| 495,192 | Great Britain | Nov. 8, 1938 |

OTHER REFERENCES

Journal American Chemical Society—A Thermal, Microscopic and X-Ray Study of the System $NaPO_3$—Partridge et al., vol. 63, February 1941, pages 454–466.

UNITED STATES PATENT OFFICE

CERTIFICATE OF CORRECTION

Patent No. 2,916,354                                                    December 8, 1959

James W. Edwards

It is hereby certified that error appears in the printed specification of the above numbered patent requiring correction and that the said Letters Patent should read as corrected below.

Column 1, line 56, for "produce" read -- product --; column 5, line 5, for "$Na_5P_2O_{10}$—I" read -- $Na_5P_3O_{10}$—I --.

Signed and sealed this 31st day of May 1960.

(SEAL)
Attest:

KARL H. AXLINE                                                ROBERT C. WATSON
Attesting Officer                                           Commissioner of Patents